Dec. 20, 1960  R. R. HOWLETT  2,964,919
CONVERTER SYSTEM FOR LIQUEFIED GASES
Filed July 6, 1959
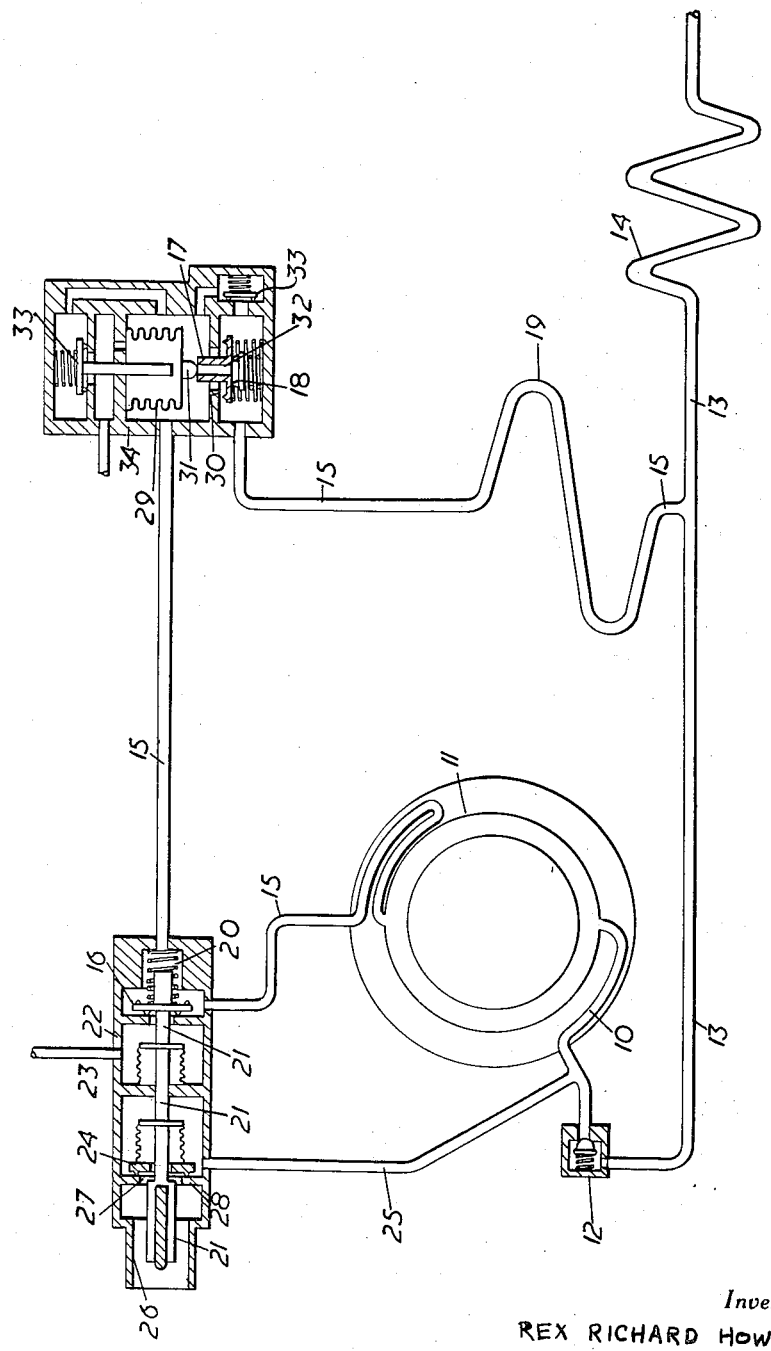
Inventor
REX RICHARD HOWLETT
By
Aaron R. Townshend Attorney United States Patent Office 2,964,919
Patented Dec. 20, 1960

2,964,919

CONVERTER SYSTEM FOR LIQUEFIED GASES

Rex Richard Howlett, Wanstead, London, England, assignor to The British Oxygen Company Limited, a British company Filed July 6, 1959, Ser. No. 825,012

Claims priority, application Great Britain July 7, 1958

1 Claim. (Cl. 62—52)

This invention relates to a converter system for liquefied gases, and has for its object to provide an improved system which provides the advantages of compactness, weight economy, and economy of equipment over converter systems hitherto proposed.

A converter system comprises a storage container for liquefied gas, such for example as liquid oxygen carried in aircraft for breathing or other purposes, and associated equipment, among which can be mentioned various valves and conduits providing a pressure build-up circuit extending externally between the liquid phase and the gaseous phase (i.e. the space above the liquefied gas) of the container and containing a vaporising coil and a pressure closing valve, a filler valve for use in charging the container with liquefied gas, a vent valve for placing the container in communication with atmosphere during a charging operation, and one or more strategically located relief valves and non-return valves.

The build-up circuit operates to generate gas pressure in the gaseous phase within the container, and it usually contains an evaporating coil into which liquefied gas trickles under gravity, the vaporised gas therefrom reaching and pressurizing the container via the pressure-closing valve which closes when a predetermined pressure is attained to stop further build-up. This internal pressures promotes the flow of liquefied gas from the container into a delivery line, which usually contains a main evaporating coil, according to a demand for a supply of gas to said delivery line. A further refinement comprises a gas economiser circuit extending between the gas phase of the container and the delivery line and containing a pressure-opening valve. This valve opens when a predetermined pressure in excess of build-up pressure is attained, to vent the container into the delivery line, and this valve operates at a lower pressure than the usual pressure-relief safety valve associated with the gas phase of the container, so that wastage of gas is minimised.

It will be apparent from the foregoing description that a converter system is a quite complicated combination of equipment, and since aircraft use is a major field of employment of converter systems, the features of compactness, economy of weight and minimising of the number of individual items are of great importance.

According to the present invention a converter system comprises a liquefied gas container the gaseous phase of which is in external conduit circuit communication with the liquid phase via a two-position change-over valve which is normally positioned to establish said communication but is movable to its second position in which it isolates said phases and connects the gaseous phase of the container to atmosphere, via a pressure-actuated valve which closes to isolate the liquid and gaseous phases when a predetermined level of gas pressure is attained within the container and which re-opens if a predetermined higher level of gas pressure is attained within the container, and also via a portion of a delivery line through which liquefied gas is fed from the container for use, said change-over valve being housed within a casing which also houses a normally-closed inlet valve which is in conduit communication with the container and is between the latter and an external opening in said casing, both the change-over valve and the inlet valve being operable by a single actuator within the casing, and said actuator being adapted for automatic operation by the action of coupling a supply nozzle in releasable engagement with the external opening in the valve casing to charge the container with liquefied gas.

With this arrangement, it will be seen that the portion of the build-up circuit which contains the pressure-closing and pressure-opening valve may be a single conduit which extends between the pressure-actuated valve and the delivery line, and functions alternatively as a gas economiser circuit as well as its function in the build-up circuit, dependent upon the functioning of the pressure-actuated valve, with obvious advantages, and furthermore the functions hitherto performed by a separate vent valve and a separate filler valve are catered for by the single valve casing which houses the filler valve and the change-over valve, said valve casing also providing the most desirable feature of automatic operation which renders impossible the incorrect manipulation of valves by an operator engaged in charging the container, since in the system constructed according to the invention there is no valve which calls for manual operation thereof.

An embodiment of the invention will now be described with reference to the accompanying drawing, which is a schematic lay-out diagram of a converter system in accordance with the present invention, with the various valves shown in diagrammatic sectional side elevation.

Referring to the drawings, a conduit 10 leads from the base of an insulated container 11 for liquefied gas and has a lightly spring-loaded non-return valve 12 therein which opens under the head of liquid in the container. This conduit, which is in communication with the liquid phase of the container 10, extends beyond the non-return valve 12 as a delivery line 13 which contains a main evaporating coil 14 in which liquefied gas is vaporised for use, according to a demand upon said delivery line 14 from equipment (not shown) in which the gas is consumed.

Between the non-return valve 12 and the main evaporating coil 14, a branch conduit 15 extends from the delivery line 13 and eventually connects with the top of the liquefied gas container 11, so that the delivery line 13 is in external conduit communication with the gaseous phase of the container 11 (i.e. the space above the liquefied gas). Commencing from the end of the conduit 15 which is connected to the top of the container 11, the conduit 15 extends to the delivery line 13 via a two-position change-over valve 16, a combined pressure-closing and pressure-opening valve 17, a non-return valve 18, and a gas vaporising coil 19 which is so positioned relative to the container 11 that liquefied gas can gravitate from the container 11 into the coil 19.

The two-position change-over valve 16 is biased by a spring 20 to the position shown in the drawing in which said conduit 15 is establishing communication between the liquid and gaseous phases of the container 11, but an actuator 21 in the casing 22 which houses the change-over valve 16 is operable to move the valve 16 to its second position, in which the portion of the conduit 15 extending to the valve casing 22 from the gaseous phase of the container 11 is placed in communication with a passage 23 in the valve casing which leads to atmosphere, thereby venting the container 11, while the portion of the conduit 15 which extends from the valve casing 22 to the delivery line 13, and thence to the liquid phase of the container, is isolated by the change-over valve 16 from the gas phase of the container 11. The valve casing 22 also houses a filler valve 24, which is biased into the position shown in the drawing in which it isolates a filler line 25 leading from the valve casing 22 to the liquid phase of the container 11 from an external filler passage 26 in the valve casing 22. Conveniently said filler line 25 joins into the conduit 10 close to the container 11. The filler valve 24 closes a port 27 in the inner end wall 28 of the filler passage 26, which passage is accessible from the exterior of the valve casing but is normally closed by a protecting cover (not shown) and a portion of the actuator 21 for the change-over valve 16 is located in said passage 26. Movement of the actuator 21 for the change-over valve 16 is also arranged to open the filler valve 24, so that the filler passage 26 is in communication with the filler line 25, and operation of the actuator 21 is effected automatically by the action of releasably coupling a supply nozzle (not shown) to said valve casing 22 and filler passage 26 for charging the container 11 with liquefied gas, the casing 22 and the supply nozzle being designed for this purpose, and the nozzle being adapted to engage and move the valve actuator 21 to operate the two valves 16 and 24. The valve actuator 21 could in turn be arranged to operate a lift valve in the abovementioned supply nozzle, said lift valve controlling the discharge of liquefied gas therefrom.

The combined pressure-closing and pressure-opening valve 17 in the branch conduit 15 is actuated by pressure in said conduit, and when a predetermined build up of gas pressure in the conduit and in the gaseous phase of the container is attained by vaporisation of liquefied gas in the vaporising coil 19 in said conduit, the valve closes to isolate the liquid and gaseous phases of the container. Flow of liquefied gas from the container 11 into the delivery line 13, according to demand, is therefore promoted by this internal operating pressure in the gaseous phase of the container 11. If there is no demand for gas in the delivery line, the pressure in the gaseous phase of the container continues to increase somewhat, over a period of time, due to normal heat inleak, but when this pressure reaches a predetermined value in excess of the normal operating pressure at which the pressure-closing valve closes, the valve 17 re-opens, as explained below, and allows gas from the gaseous phase of the container 11 to vent into the delivery line 13 past the valve 17 and past the non-return valve 18. This arrangement effects desirable economy of gas, rather than wasting the gas to atmosphere via the customary safety pressure-relief valve associated with the gaseous phase of a container system, and it will be understood that while a pressure-relief valve 33 is provided, it operates at a pressure in excess of the pressure required to re-open the pressure-closing valve 17 and normally will not be called into use.

This combined pressure-closing and pressure-opening valve conveniently comprises a pressure-contractible spring-expanded bellows 29 in a valve casing 34, which bellows normally engages and holds the tubular valve member 17 clear of a valve seating 30 in the casing, so that the branch conduit 15 is open. The bellows 29 itself has a valve seating 31 by which it makes engagement with one end of the tubular valve member 17 so as to close the bore 32 therein.

This condition of the valve 17 is shown in the drawing, and is the condition thereof immediately after charging the container 11 with liquefied gas. As previously explained, liquid gas gravitates from the newly-charged container 11 via conduit 10, non-return valve 12 into the delivery line 13, and into branch conduit 15 and vaporising coil 19. Gas vaporised in coil 19 pressurises the remainder of branch conduit 15 via open valve 17, and also pressurises the gaseous phase of the container 11 to pressure-feed liquefied gas therefrom into conduit 10. Pressure in branch conduit 15 increases due to continued evaporation of liquefied gas in coil 19, until such time as the pressure in branch conduit 15 commences to contract the bellows 29 progressively, eventually to a degree such that valve 17 engages with the seating 30 to close the branch conduit 15 and prevent further pressurisation of the gaseous phase of container 11 by the vaporising coil 19. The foregoing explains the "pressure-closing" function of valve 17 and the manner in which branch conduit 15 functions as a "build-up circuit." If the system stands unused and pressurised, the pressure in the gaseous phase of container 11 may increase to excess by some vaporisation of the liquefied gas held in container 11, with a similar pressure rise in the portion of branch conduit 15 extending therefrom to the valve 17. This excess pressure further contracts the bellows 29 and lifts the valve seating 31 of bellows 29 from the end of the tubular valve member 17, thereby opening the bore 32 in the latter and re-opening the branch conduit 15 to allow excess pressure gas to be expanded into delivery line 13 from the branch conduit 15, which is then functioning as the economiser circuit.

At the lower right hand side of valve casing 34 is located a by-pass valve 33, across valve 17, which can open only in the direction of flow from delivery line 13 through branch conduit 15 to the gaseous phase of container 11. Said by-pass valve 33 ensures that there can never be an excess of pressure in delivery line 13 over the pressure existing in the gaseous phase of the container 11, which would tend to cause reverse flow in delivery line 13.

It will be seen that the converter system according to the invention achieves the stated objects, particularly as regards economy of items of equipment, and a further economy in this respect can be achieved by including the safety pressure-relief valve 33 associated with the gaseous phase of the container 11 in the same casing 34 as houses combined pressure-closing and pressure-opening valve 17, as shown in the drawing.

What I claim is:

In a converter system for liquefied gas, the combination of a liquefied gas container, a delivery conduit extending from the base of said container to feed liquefied gas from the liquid phase thereof, pressure build-up conduit means extending from the top of said container to said delivery line, whereby the liquid phase of the container is in external communication with the gas phase thereof at the top of the container, a valve casing in said build-up conduit, a two-position change-over valve in said valve casing, an actuator which carries said change-over valve, said change-over valve in one position establishing communication between said gas and liquid phases via the build-up conduit and in its second position connecting the gas phase of the container with a vent port in said casing while closing the build-up conduit, an inlet valve in said casing and carried by said actuator, an inlet conduit extending from said casing to the liquid phase of the container, said casing having an inlet port for liquefied gas and said inlet valve being operable by said actuator to open said inlet conduit to said inlet port simultaneously with the movement of the change-over valve to its second position, a second valve casing in said build-up conduit between the first valve casing and the delivery line, a pressure-actuated valve in said second casing which is operable to close and obturate said build-up conduit at a predetermined gas pressure and to re-open at a second predetermined higher gas pressure, and a gas vaporiser between said second valve casing and the delivery line.

References Cited in the file of this patent

UNITED STATES PATENTS

| 2,565,872 | Melsheimer | Aug. 28, 1951 |
| 2,576,985 | Wildhack | Dec. 4, 1951 |